July 14, 1970 — L. L. FLOWERS — 3,520,489
TRANSMISSION WIRE STRINGING DEVICE
Filed March 1, 1968 — 4 Sheets-Sheet 1
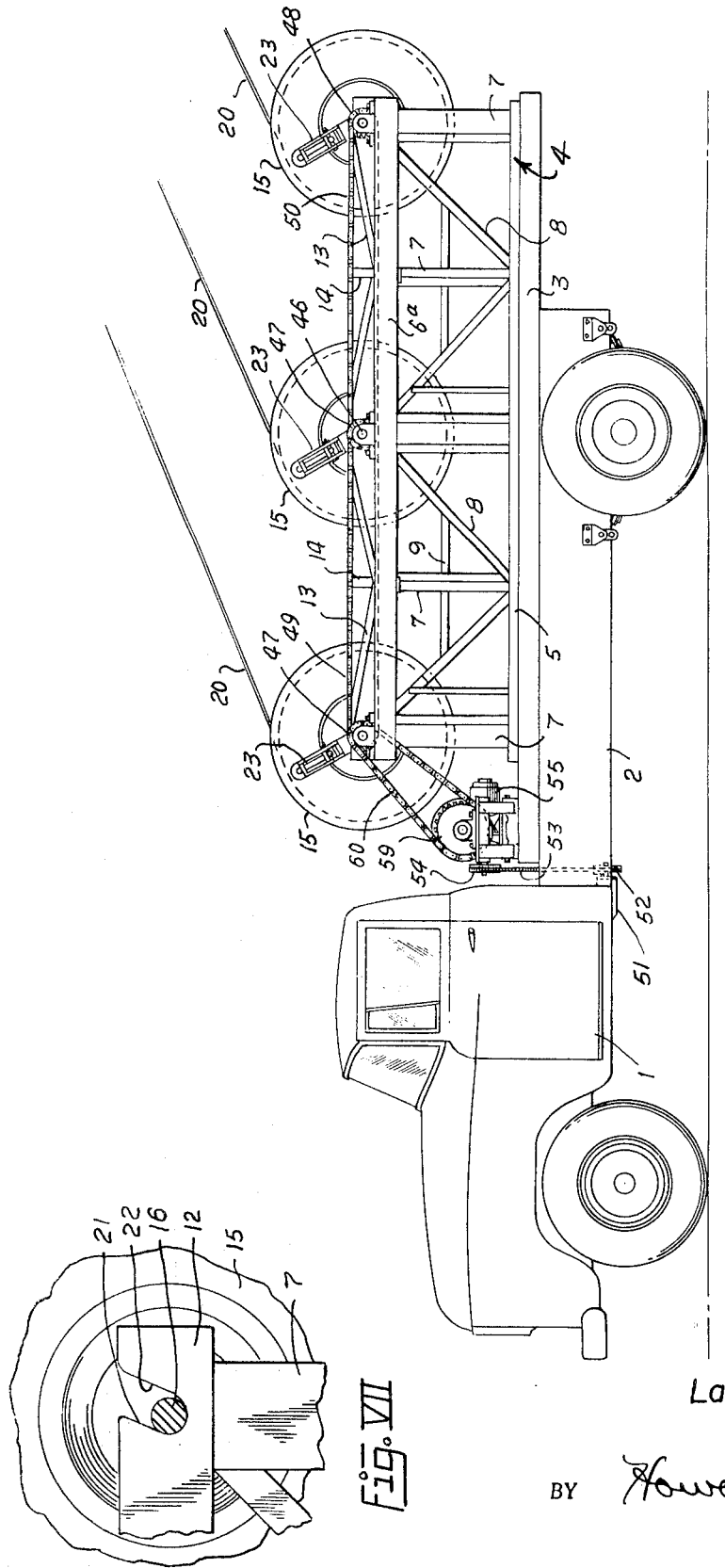
INVENTOR
Lawrence L. Flowers
BY Howard E. Moore
ATTORNEY July 14, 1970      L. L. FLOWERS      3,520,489
TRANSMISSION WIRE STRINGING DEVICE
Filed March 1, 1968      4 Sheets-Sheet 2
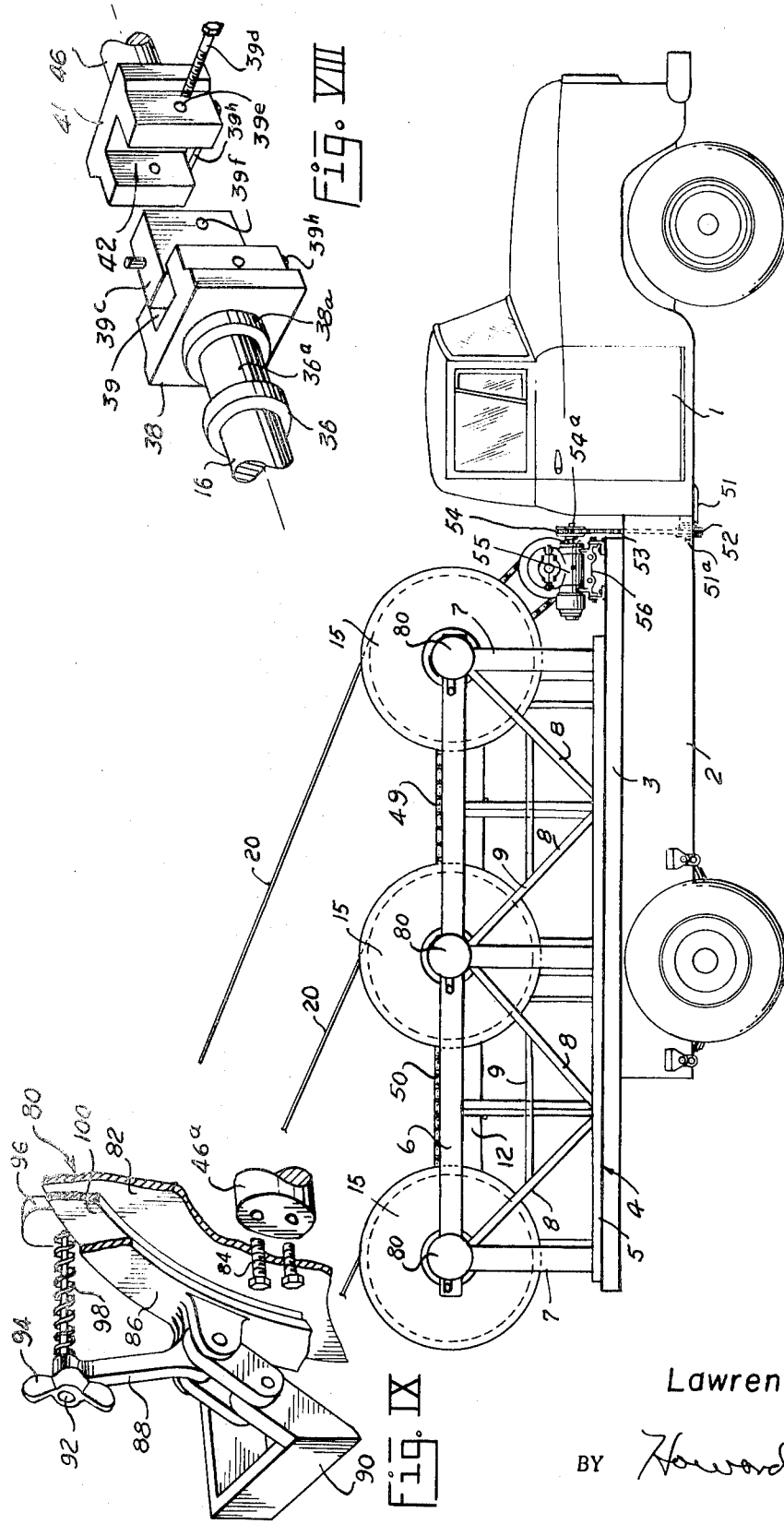
INVENTOR
Lawrence L. Flowers
BY Howard E. Moore
ATTORNEY

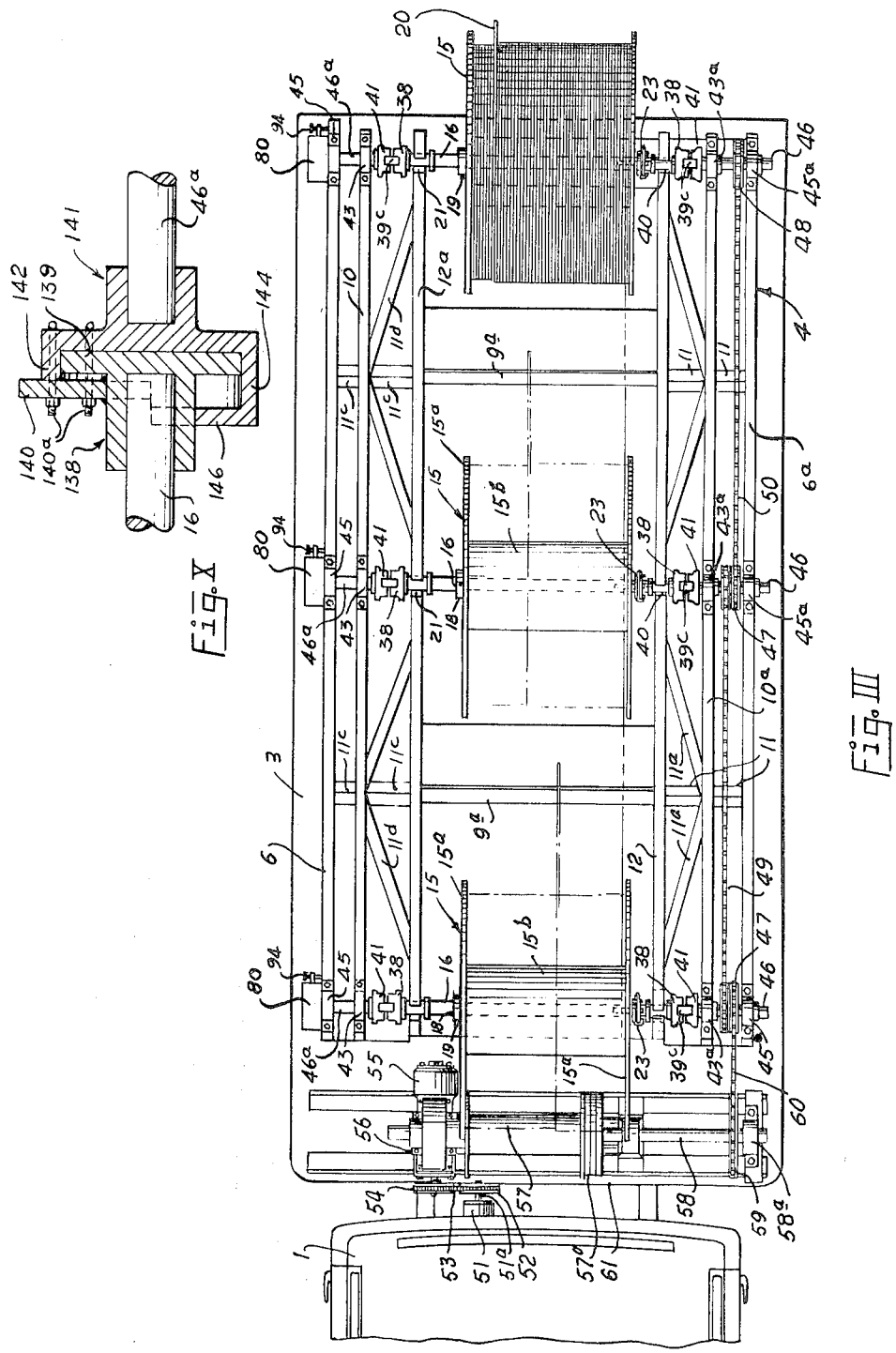

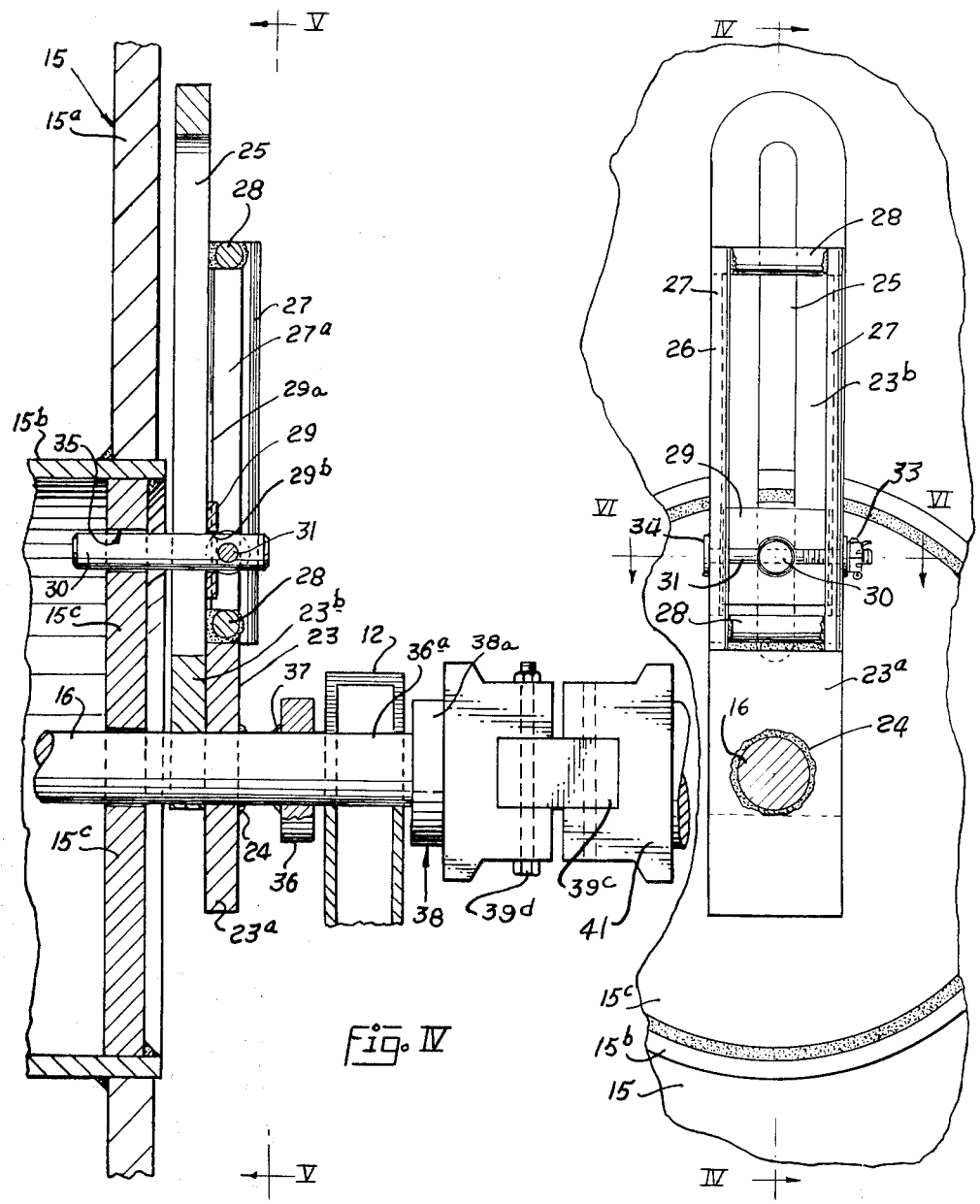
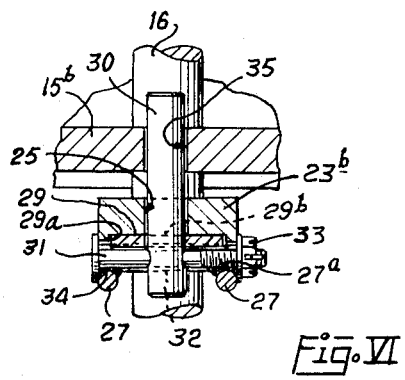

3,520,489
TRANSMISSION WIRE STRINGING DEVICE
Lawrence L. Flowers, P.O. Box 311,
Hillsboro, Tex. 76645
Continuation-in-part of application Ser. No. 648,870,
June 26, 1967. This application Mar. 1, 1968, Ser.
No. 709,671
Int. Cl. B65h 75/40
U.S. Cl. 242—86.5   14 Claims

ABSTRACT OF THE DISCLOSURE

A device for stringing transmission lines comprising a vehicular mounted support frame with aligned upwardly facing bearing slots whereby shafts with spools mounted thereon may be raised from or lowered into the bearing slots. A quick release coupling and clutch are provided for connecting the spool shafts to drive and braking means.

BACKGROUND OF THE INVENTION

This is a continuation-in-part of my co-pending patent application Ser. No. 648,870, filed June 26, 1967, now abandoned.

In stringing transmission lines or cables, the lines or cables are wound upon storage spools and are unwound therefrom for stringing same by take-up spools located at a remote position from the storage spools. Each storage spool will be a pay-out spool and in a normal operation a pulling line which may be a rope or cable will be connected to one end of the conductor which has been reeled onto the storage spool. The pulling line will then be paid out along the path over which the transmission line is to be strung.

The reel from which the pulling line is being paid out must be removed from its vehicular mounting and lifted over power lines or other obstructions crossing the path along which the transmission line is being strung. Otherwise, it would be necessary to cut and splice the pulling line when such obstructions are encountered. Since splicing the pulling line is both time consuming and results in reduction in strength of the pulling line, splicing is not desirable due to the expense of labor and materials.

Structure disclosed in the aforementioned patent application is a significant improvement over wire stringing devices heretofore developed, however I have discovered valuable improvements which increase the efficiency and versatility of the device disclosed therein.

In wire stringing operations it is often desirable to disconnect the power from one or more of the spools while holding the wire reeled on one spool in tension while another spool is dimounted from the vehicle frame. This requires a brake, a clutch and disconnectable couplings be mounted in the drive shaft of each spool.

It is also desirable to have a braking means on the pay-out reels to prevent backlash of the transmission line or cable by maintaining the angular velocity of the spool at a desirable rate. When transmission line or cable is being paid out, the spool may rotate at a substantial speed, making it desirable to use a brake which will stop the spool quickly because the spool will continue to rotate due to its own momentum even though tension is removed from the cable being paid out.

SUMMARY OF THE INVENTION

The present invention incorporates improved braking and drive means into a novel transmission wire stringing device in which any spool can be a power-driven take-up spool or a free-wheeling pay-out spool. Any given spool may be quickly and easily removed from the vehicle frame while the speed of the spool may be accurately regulated while it is mounted on the vehicle frame.

One or a plurality of take-up or pay-out reels may be mounted on the frame for the device, and individual reels may be removed from or mounted upon the frame by simply lifting or lowering the individual reels vertically to cause the mounting shafts therefor to be lowered into or removed from aligned slots in the side members of the frame as a slip joint connection between the drive means and the spool shaft is engaged or disengaged.

The mounting shaft for each spool has a slotted female connector head at each end thereof. Stub shafts are rotatably mounted on the frame at each end of the mounting shaft. One stub shaft is connected to drive means for providing power to rotate the spool while the other stub shaft has a brake connected thereto for stopping the rotation of the spool.

Each stub shaft has a slotted female connector head allowing insertion of a connector link in the slots of the heads on the stub shafts and on the mounting shaft. The connector link may be bolted into the slot of one of the female heads thereby converting it to a male head whereby a connection may be formed by lowering the mounting shaft into the bearing slot which simultaneously makes the connection with the drive and brake shafts.

It is the primary object of the invention to provide a transmission line stringing device wherein a selected number of spools may be mounted upon or dismounted from a common frame by simply lowering or lifting upwardly the spools for disposition upon or removal from the frame.

Another object of the invention is to provide a transmission wire stringing device wherein a disengageable driving connection is provided between the drive means therefor and the mounting shaft for the spools by a slip-joint connection which is engaged or disengaged by lowering or raising the spools into engagement or disengagement with the frame.

A still further object of the invention is to provide in a transmission line stringing device wherein the spools may be free wheeling about the mounting shaft therefor or the mounting shaft may be disengageably connected to the spools to provide a driving connection between the mounting shafts and the positive drive means for the spools, whereby the spools may be either pay-out reels or take-up reels as may be desired.

Still another object of the invention is to provide in a transmission line stringing device a plurality of reels rotatably mounted upon a frame wherein individual reels on the frame may be selectively employed as free-wheeling pay-out reels or power-driven take-up reels.

Still another object of the invention is to provide a disengageable driving connecting between the individual spools mounted on the frame wherein the connection is adjustable to adapt same for engagement with different types and sizes of reels.

A still further object of the present invention is to provide brakes which are selectively engageable on the mounting shaft of each spool to regulate the speed or stop the spool when it is desirable to do so.

A still further object of the invention is to provide a coupling between the drive shaft and the mounting shaft for the spool which may be quickly and easily disconnected to convert any given spool from a take-up reel to a pay-out reel or to dismount the spool from the vehicle frame.

A still further object of the present invention is to provide a clutch device which may be engaged to deliver power to any given reel.

Other and further objects of the invention will become apparent upon reading the detailed specification hereinafter following and by referring to the drawings attached hereto.

3,520,489

DESCRIPTION OF THE DRAWING

The accompanying drawings of a preferred embodiment of the present invention are provided so that the invention may be better and more fully understood, in which:

FIG. I is a side elevational view of the transmission wire stringing device mounted upon a truck, FIG. II is a side elevational view of the transmission line stringing device taken from the opposite side of FIG. I, FIG. III is a plan view of the transmission line stringing device, FIG. IV is a sectional view taken along the line IV—IV of FIG. V, FIG. V is a sectional view taken along the line V—V of FIG. IV.

FIG. VI is a sectional view taken along the line VI—VI of FIG. V,

FIG. VII is an enlarged elevational view of a typical open slot mounting for the supporting shafts for the spools, FIG. VIII is an exploded view of the slip joint connection between the disengageable drive means between the supporting shafts for the spools and the spools, FIG. IX is a perspective view of a typical brake with parts broken away.

FIG. X is a vertical sectional view of a modified coupling.

Numeral references are employed to indicate the various parts shown in the drawings and like numerals indicate like parts throughout the various figures of the drawings.

DESCRIPTION OF A PREFERRED EMBODIMENT

The numeral 1 indicates a supporting vehicle for the device, which in this instance is a truck. The truck 1 includes a general frame 2 upon which is mounted a bed 3.

The mounting frame for the spools and drive mechanism hereinafter described includes a general frame 4 made up of spaced parallel bottom rails 5 secured to the truck bed 3, spaced parallel outer top rails 6 and 6a, which are spaced apart and supported by upright corner posts 7, angle braces 8, cross brakes 9 and lateral braces 9a.

Inner longitudinal beams 10 and 10a, best shown in FIG. III, are provided to support the bearings 43 thereon as hereinafter described.

Other longitudinal frame members 12 and 12a are provided extending between the ends of the frame which is supported by, and spaced from, outer rails 6 and 6a and inner rails 10 and 10a by cross spacer members 11 and 11c secured therebetween, and are further supported by the angle braces 11a and 11d extending between said members.

It will be noted, as best seen in FIG. I, that the longitudinal frame members 6 and 6a and 10 and 10a are on a lower level than the longitudinal frame members 12 and 12a so as to accommodate the bearings 45 and 43 mounted on the upper surface thereof and to place the stub-shafts 46 of the drive connection in alignment with supporting shafts 16 of the spools 15, which are recessed in the slots 21 and 40 formed in longitudinal frame members 12 and 12a respectively as best shown in FIG. VII of the drawing.

Each of the spools 15 includes spaced outer flanges 15a and a central drum 15b. The spools 15 are supported on shafts 16 which form axles therefor. The shafts 16 are extended through central passages through the ends 15c of the spools. The spools 15 may have sheaves (not shown) on one end thereof for rotating same through a belt drive if desired. The spools are retained on the shafts 16 by ring retainers 18 slipped over the rods which may be held in place on the shafts by set screws 19. Thus the spools are held inwardly in position for engagement of the adapter 23 therewith as hereinafter descirbed.

Transmission wires or cables 20 may be stored on the spools 15 from which it may be unwound for stringing, or if the spools are used as take-up spools, they may not initially have transmission cable wound thereon, but may have a rope or cable windable thereabout for pulling the transmission line from storage spools in a remote location.

The shafts 16 are suspended to the longitudinal side frame members 12 and 12a by being freely positioned and rotatable in the open slots 21 and 40.

The slots 21 and 40 are undercut as indicated at 22 in FIG. VII so that when a horizontal or diagonal force is exerted by pulling the wire therefrom or winding wire thereupon in the direction of the undercut, the spools will not have a tendency to be lifted out of the slots 21 and 40.

A drive adapter 23 is secured to each of the spool shafts 16. Each drive adapter 23 includes an inner member 23a and an outer member 23b (see FIG. IV). The inner and outer members 23a and 23b are rigidly secured together and the rod 16 is passed through a hole provided therein and is rigidly secured thereto by means of a weld 24.

An elongated slot 25 is provided in the inner member 23b. The outer member 23a has a bifurcated guide portion 26 secured to the outer end thereof which is formed by spaced parallel side rods 27 and spaced end rods 28 which are welded together to provide a rectangular frame with spaced side channels 27a therein. The lug 29 is slidably disposed in a channel 29a provided on the inner surface of the frame member 23b.

A hole 29b is provided through the lug 29. The pin 30 is extendable through the hole 29b and the elongated slot 25.

The pin 30 is held in place by a securing bolt 31 which extends through side channels 27a and through a hole 32 provided through the pin 30. The head 34 on the bolt 31 engages the outer sides of one of the channels 27a and the nut 33 is threadedly engaged on the other end of the bolt 31 and engages the outer side of the opposite channel 27a to thereby hold the pin 30 in position on the adapter 23.

It will be seen that the pin 30 is adjustable along the slot 25 in that the lug 29 may be moved along the channel 29a to a desired position before the pin 30 is inserted through the hole 29b and slot 25 and into a hole 35 provided in the end closure 15c of the drum 15b. After being so positioned, the bolt 31 may be passed through the channel 27a and hole 32 and the nut 33 may be threaded upon the bolt 31 to fix the pin 30 in place. Thereby the adapter 23 is arranged for attachment to spools having drums 15b of different diameters wherein the hole 35 through the end closure 15c thereof may be placed in various radial positions.

It will be seen that the spool 15 is freely rotable on the shaft 16 until the adapter 23 is secured thereto by fixing the pin 30 in place in the hole 35 as hereinbefore described. When the pin 30 is in place the spool 15 will rotate with the shaft 16, but when the pin 30 is withdrawn and removed, the spool 15 is permitted to rotate about the shaft 16.

Each shaft 16 has a spacer collar 36 secured thereabout which may be rigidly secured thereto by any suitable means such as weld 37.

A female attachment head 38 is secured to each outer end of each shaft 16 which includes a collar 38a secured to the shaft 16 and is terminated at its outer end by an elongated slot 39. The collars 36 and 38a are spaced apart to provide areas 36a on the shafts 16 which are insertable into the open upwardly facing slots 21 and 40 in the side frame members 12 and 12a.

A female head 41 is provided on the inner end of each of the stub-shafts 46 and 46a. The shafts 46 and 46a are rotatably supported in bearings 45 and 45a secured to the upper surface of the side frame members 6 and 6a. Each female head 38 and 41 includes an elongated slot 39 and 42 on the outer face thereof arranged to slidably receive an elongated connector 39c so that upon rotation of the heads 41 through the power means hereinafter described, the heads 38 will be rotated therewith and thereby the shafts 16 will be rotated.

As best illustrated in FIG. VIII, the connector link 39c may be rigidly connected in the slot of one of the female heads 38 or 41 by a bolt or pin 39d passing through holes 39e in the female heads and hole 39f in the connector link 39c. When the pin 39d is in place, the mounting shaft 61 may be lifted from the bearing slots 21 and 40 without any disassembly of parts. When the shaft 16 is lowered into the slots 21 and 40, the connector link, pinned to one of the female heads, may be guided into the slot of the other female head thereby making a connection between mounting shaft 16 and stub-shafts 46 and 46a.

Stops 39h are welded or otherwise securely attached to the lower edge of each female head 38 and 41 to assure alignment of holes 39e and 39f to facilitate insertion of pin 39d to lock the link 39c in position.

To make any given spool a pay-out spool, the link 39c may be removed from the heads connected to drive shaft 46 by merely removing the one pin 39d and withdrawing the link from the slots in the female heads. The brake 80 may be actuated to control the rate of rotation of the pay-out spool to prevent backlash.

In certain extreme situations it may be desirable to hold line 20 in very high tension on a pay-out spool. If the shaft 16, due to high tension in the cable, tries to walk up the inclined surface 21, causing the shaft 16 to disengage itself from slot 22 in member 12, it should be noted that holes 39e are provided in each female head 38 and 41, allowing pin 39d to be inserted in each head thereby forming a rigid coupling which will tend to hold shaft 16 in slot 22.

When the single pin 39d will not hold shaft 16 in slot 22 a modified coupling (best illustrated in FIG. X) may be utilized. The modified coupling consists of a male head 138 which may be secured to shaft 16 and a female head 141 which may be secured to stub-shaft 46a. The female head 141 consists of a hollow, cylindrical housing having a short upper portion 142 and an elongated lower portion 144. A cover plate 146 is welded, or otherwise securely attached, to the lower portion 144 of the housing, forming a semi-circular stirrup for receiving and retaining therein the male head 138.

The male head 138 consists of a bearing plate 139 and a lock plate 140 secured thereto in spaced apart relation. The bearing plate 139 may be inserted into the stirrup of the female head 141 and pushed into the enclosure formed by the upper portion 142 and lower portion 144. Lock plate 140 is of substantially semi-circular configuration such that the lower portion of the lock plate 140 rests upon the upper portion of the elongated lower portion 144 fo the female head 141 when bearing plate 139 is inserted into the opening of the female head 141 thereby preventing rotation of shaft 16 relative to shaft 46a. J-bolts 140a extend through locking plate 140 and engage the rear edge of the female head 141 thereby preventing axial movement of the male head 138 with respect to the female head 141.

It should be readily apparent that the modified head shown in FIG. X of the drawing forms a strong rigid coupling which will not allow the shaft 16 to crawl up the inclined side 21 of slot 22 even though extremely high tension is maintained in line 20 on spool 15.

Bearing blocks 43 and 43a are secured to the upper surfaces of the side frame members 10 and 10a in which the inner ends of the stub-shafts 46 and 46a are rotatably mounted and supported.

Pairs of sprockets 47 are secured to the two forward shafts 46 and a single sprocket 48 is secured to the rearmost shaft 46. A drive chain 49 extends about the innermost sprockets of the pairs of sprockets 47, and a drive chain 50 extends about the outermost sprocket of the middle pair of sprockets 47 and about the rearmost sprocket 48.

While any suitable power means may be employed, the spools 15 are driven from the power takeoff 51 on the vehicle 1 in the embodiment of the invention shown in the drawing. The power takeoff has a shaft 51a extending therefrom to which is secured a sprocket 52.

A drive chain 53 extends about the sprocket 52 and about a driven sprocket 54 which is attached to the shaft 54a of a transmission 55. The transmission 55 is secured to the frame 3 of the truck by means of a suitable support frame 56. A driven shaft 57 extends from the transmission 55 which in turn drives a shaft 58 through a driving connection 57a. The shaft 58 is rotatably disposed in a bearing block 58a which is secured to a support frame 61 of the drive assembly. The frame 61 is secured to a support rfame 61 of the drive assembly. The frame 61 is secured to the truck bed.

A sprocket 59 is secured to the shaft 58 and is rotatable therewith.

A drive chain 60 extends about the sprocket 59 and about the outermost sprocket of the front pair of sprockets 47.

A brake 80 may be provided on each shaft 46a. While any braking means may be utilized, the particular brake shown in FIGURE IX utilizes a disk 82 mounted on the end of each shaft 46a by bolts 84 thereby causing the disk 82 to rotate with the shaft 46a. A brake shoe 86 is pivotally mounted on lever arm 88 which is in turn pivotally mounted on mounting bracket 90. a threaded rod 92 passes through an aperture in lever arm 88 and threadably engages adjusting nut 94. The other end of the threaded rod 92 is secured to an immovable anchorage 96 which is welded or otherwise rigidly connected to longitudinal members 6. A spring 98 on threaded rod 92 urges lever arm 88 outwardly moving the brake shoe 86 away from disk 82. When adjusting nut 94 is tightened spring 98 is compressed and lever arm 88 is rotated forcing brake shoe 86 and consequently brake linings 100 into contact with disk 82 to provide braking action to shaft 46a.

The operation and function of the device hereinbefore described is as follows:

The spools 15 are mounted upon the shafts 16 which includes the adapter assembly 23 and the female heads 38 secured thereto. The individual spools may be mounted upon the frame by lifting same and lowering them into place on the fram so that the outer ends of the shafts 16 and the areas 36a thereon will fall into the spaced open slots 21 and 40 in the upper surfaces of the side frame members 12 and 12a.

The connectors 39c are guided into the open slots 42 on the female heads 41 so that there is a rotatable connection between the drive means and the shafts 16.

If the spools 15 are to be used as pay-out spools from which transmission cable is to be unwound and strung across arms of poles or otherwise, the lines 20 are wound on the spools, and the connector 39c is removed from the slots in the female heads 38 and 41 on drive shaft 46 allowing the shaft 16 to freely rotate. The speed of rotation may be controlled by brake 80 to prevent backlashing.

If the spools 15 are to be used as take-up spools, the adapters 23 will be attached to the spools 15 by the adjusting the lug 29 longitudinally of the frame therefor to cause the hole 29b therethrough to concide with the hole 35 in the end of the spool. The pin 30 is inserted through the hole 29b, slot 25 and hole 35 and is secured in place by inserting the pin 30 through the transverse hole 32 in the pin 30, and securing the nut 33 in place. Drive shaft 46 is coupled with shaft 16 by inserting connector 39c. Thereby upon rotation of the shaft 16 through the power means as indicated, the spool 15 will be rotated. The ends of the transmission lines 20 to be unwound from spools 15 in a remote position will be attached to the pulling line which will in turn be wound about the take-up spools 15 so that upon rotation of the spools 15 through the power means the lines 20 will be unwound from the spools 15 at a remote location, which are employed as pay-out spools. The brake 80 may be used to prevent backlash when the take-up spool is stopped.

After attachment of the adapters 23 to the spools the clutch (not shown) controlling the power take-off 51 is engaged to rotate the shafts 16 and the spools 15 attached thereto through the power train including the sprocket 52, drive chain 53, sprocket 54, transmission 55, sprocket 59, shafts 57 and 58, sprockets 59, drive chain 60, sprockets 47, drive chains 49 and 50 and sprocket 48 which in turn rotates the shafts 46 and interengaged heads 41 and 38, coupled by connector 39c, and therethrough the shafts 16 which in turn rotate the spools 15 through adapters 23.

It will be apparent that a plurality of transmission lines 20 may be simultaneously strung over the cross arms of transmission line poles by providing a stringing assembly as hereinbefore described at one location with transmission lines wound on the drums with connectors 39c removed thereby disengaging the shafts 16 so as to be employed as pay-out reels and providing another wire stringing unit at another location wherein the spools 15 are drivingly engaged to the power drive therefor through connectors 39c. The transmission lines on the pay-out spools may be attached to the pulling line which may be suitable cables or ropes which are wound about the power-driven spools to thereby pull the transmission lines over the cross arms of the poles along the ground or otherwise in position to be secured thereto. Of course, a single unit may be employed as a take-up or pulling unit from free wheeling storage spools mounted in any suitable manner.

A plurality of such transmission lines may be quickly and easily strung in a single operation over a considerable distance thereby resulting in a great saving of manpower and equipment.

It will, of course, be apparent that any number of such spools 15 may be disposed upon a single vehicle. The representation of three being only for illustration purposes.

It will also be noted that the spools 15 may be quickly and easily converted from pay-out spools to take-up spools by the simple expedient of removing connector 39c or disconnecting the drive adapters 23; and that one or a plurality of spools mounted on a single vehicle may be interchangeably used as pay-out or take-up spools by the simple expedient of inserting or removing selected connectors 39c.

It will also be noted that the spools may be quickly and easily removed from and mounted upon the supporting frame therefor without the necessity of disassembling parts by simply lowering same into or lifting them from the open slots 40 and 21 as the slip joint connections between the heads 41 and 38 are made thereby permitting the drums and lines thereon to be lifted over transmission lines or other obstructions to avoid the necessity of severing or detaching the lines or disassembling the equipment.

It will thus be seen that I have provided an extremely flexible and utilitarian line stringing or take-up vehicle which is simple, safe and easy to operate, which is relatively inexpensive to manufacture and use, and results in a great saving of labor, time and materials in stringing or taking down transmission lines.

It will be apparent that other and further embodiments of my invention may be devised without departing from the spirit and scope of the appended claims.

Having described my invention, I claim:

1. In a transmission wire stringing or take-up device, a support frame; at least one spool mounted on the frame; a shaft supported by the frame on which the spool is mounted; drive means supported by the frame arranged to rotate the shaft; and disengageable attachment means between the shaft and the drive means, said disengageable attachment means comprising a head driven by the drive means, a head on the shaft, and slidable connector means to detachably join the heads.

2. The combination called for in claim 1 wherein the frame includes spaced parallel side members having aligned open slots in the upper faces thereof arranged to receive the shaft when lowered thereinto.

3. The combination called for in claim 2 wherein the slots are undercut in the direction of the winding or withdrawal of transmission line onto or from the spool whereby the shafts may be freely disposed in said slots, but will not be withdrawn therefrom by horizontal or diagonal force exerted against the shaft by withdrawal or winding of line from or onto the spool.

4. The combination called for in claim 1 with the addition of disengageable connection means between the shaft and the spool comprising an adapter including a pin removably attachable thereto insertable into a hole in the end of the spool to provide a driving connection therebetween.

5. The combination called for in claim 4 wherein the pin is adjustable longitudinally of the adapter so that same may be adjusted to fit holes at different diametrical locations in the end of the spool.

6. In a transmission line stringing or take-up device, a frame; a plurality of spools rotatably mounted on the frame; a plurality of shafts attached to the frame and rotatably supporting each of the spools; common drive means for all of said shafts, said common drive means including a stub shaft rotatably mounted on the frame adjacent at least one end of each shaft supporting the spools; and means to selectively engage or disengage the drive means to the spools comprising a head on the end of each shaft and each stub shaft, and slidable connector means to detachably join the heads.

7. The combination called for in claim 6 with the addition of brake means mounted on the frame associated with each shaft to control the rotation of said shafts.

8. The combination called for in claim 6 wherein the frame includes spaced longitudinal side members having aligned, open, slots in the upper surfaces thereof arranged to received the shafts when lowered thereinto.

9. The combination called for in claim 6 with the addition of disengageable attachment means between the shafts and the spools comprising elongated adapter members secured to the shafts having pins longitudinally adjustable therealong and insertable into holes provided in the ends of the spool; and means to secure the pins in adjusted position on the adapters.

10. In a line stringing or take-up device, a frame including spaced parallel side rails; at least one spool mounted on the frame; a shaft on which the spool is mounted; a pair of aligned open slots in the upper surfaces of the rails arranged to freely receive the shaft; an adapter secured to the shaft disengageably attachable to the spool, said spool being freely rotatable about the shaft but being rotatable with the shaft when the adapter is engaged therewith; a head on the shaft disposed on the outer side of one of the rails; drive means including an axle rotatably secured to the frame; a head on the inner end of the axle; disengageable connection means between the heads; and means to rotate the drive means.

11. In a line stringing or take-up device, a frame including spaced parallel side rails; at least one spool mounted on the frame; a shaft on which the spool is mounted; a pair of aligned open slots in the upper surfaces of the rails arranged to freely receive the shaft; an adapter secured to the shaft disengageably attachable to the spool, said spool being freely rotatable about the shaft but being rotatable with the shaft when the adapter is engaged therewith; a first head on the shaft having a channel on the outer face thereof, said head being disposed on the outer side of one of the rails; drive means including an axle rotatably secured to the frame; means to rotate the drive means; a second head on the inner end of the axle having a channel on the inner face thereof; a removable connector link in the channel on the outer face of the first head lowerable into the channel on the second head to provide a disengageable connection between the first named shaft and the drive means, the said first named shaft may be disengageable from the drive means by removing the removable connector link.

12. In a transmission wire stringing or take-up device, a support frame; spaced parallel side members on the frame having aligned opened slots in the upper faces thereof arranged to receive a shaft when lowered thereinto; a shaft rotatably disposed in the slots in the side members; a spool mounted on the shaft; drive means supported by the frame arranged to rotate the shaft; a head driven by the drive means having an elongated slot in the outer surface thereof; and a head attached to the shaft having means thereon arranged to be lowered into and withdrawn from the slot in the head driven by the drive means whereby the spool may be selectively rotated by the drive means or may freely rotate with the shaft.

13. In a transmission wire stringing device, a support frame, spaced parallel side members having aligned open bearing slots in the upper faces thereof; at least one shaft journaled in the bearing slots; a spool supported by the shaft, said spool being rotatable with the shaft; drive means supported by the frame arranged to rotate the shaft; a head driven by the drive means having an elongated slot in the outer surface thereof; a second head attached to the shaft having an elongated slot in the outer surface thereof; a connector arranged to be lowered into or withdrawn from the slots; and disengageable attachment means for attaching the connector in the slot of at least one of the heads, said connector being arranged to enter the slot in the other head to disengageably attach the heads together, said bearing slots in the upper faces of the side members being undercut in the direction of the winding or withdrawal of transmission wire onto or from the spool whereby the shafts may be freely disposed in said bearing slots, but will not withdraw therefrom by horizontal or diagonal force exerted against the shaft by withdrawal or winding of line from or onto the spool.

14. The combination called for in claim 1 with the addition of brake means between the frame and the shaft to control rotation of said shaft.

References Cited

UNITED STATES PATENTS

| | | | |
|---|---|---|---|
| 315,803 | 4/1885 | Logan | 242—86.5 X |
| 1,311,956 | 8/1919 | Elsinger et al. | 242—86.6 |
| 2,451,791 | 10/1948 | Weaver. | |
| 2,499,030 | 2/1950 | Moon. | |
| 2,635,827 | 4/1953 | Stemm et al. | 242—86.7 |
| 2,793,820 | 5/1957 | Torgeson | 242—86.5 |
| 2,823,873 | 2/1958 | Peterson | 242—86.5 |
| 3,000,588 | 9/1961 | Brady | 242—86.5 |
| 3,063,584 | 11/1962 | Fleischer et al. | 242—86.5 |
| 3,098,624 | 7/1963 | De Forest | 242—86.7 |

NATHAN L. MINTZ, Primary Examiner